Oct. 16, 1956 M. T. HEDQUIST ET AL 2,766,674
LATCH FOR TRACTOR MOUNTED TILTING PLOW
Original Filed March 30, 1945 3 Sheets-Sheet 1
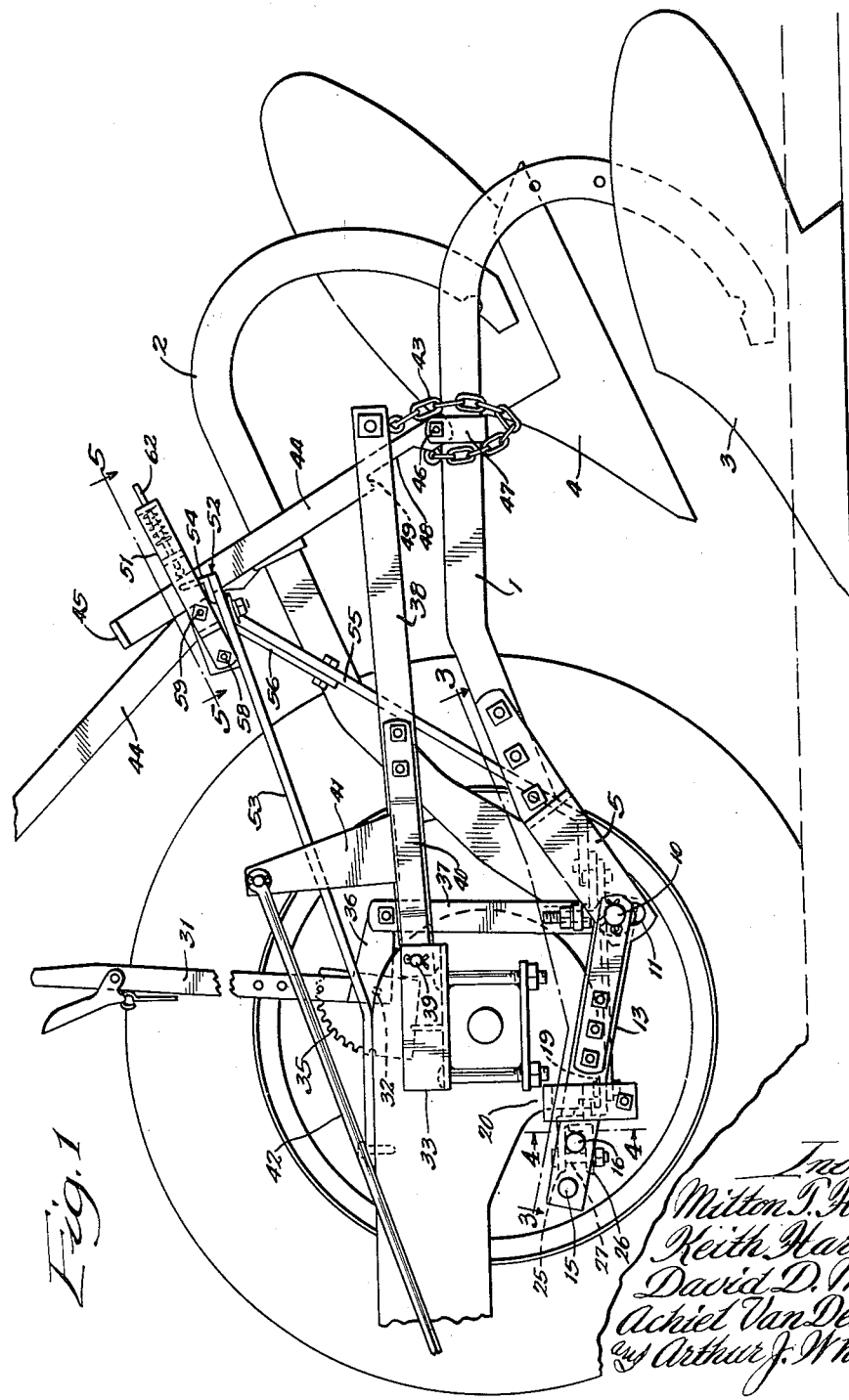

Oct. 16, 1956 M. T. HEDQUIST ET AL 2,766,674
LATCH FOR TRACTOR MOUNTED TILTING PLOW
Original Filed March 30, 1945 3 Sheets-Sheet 2
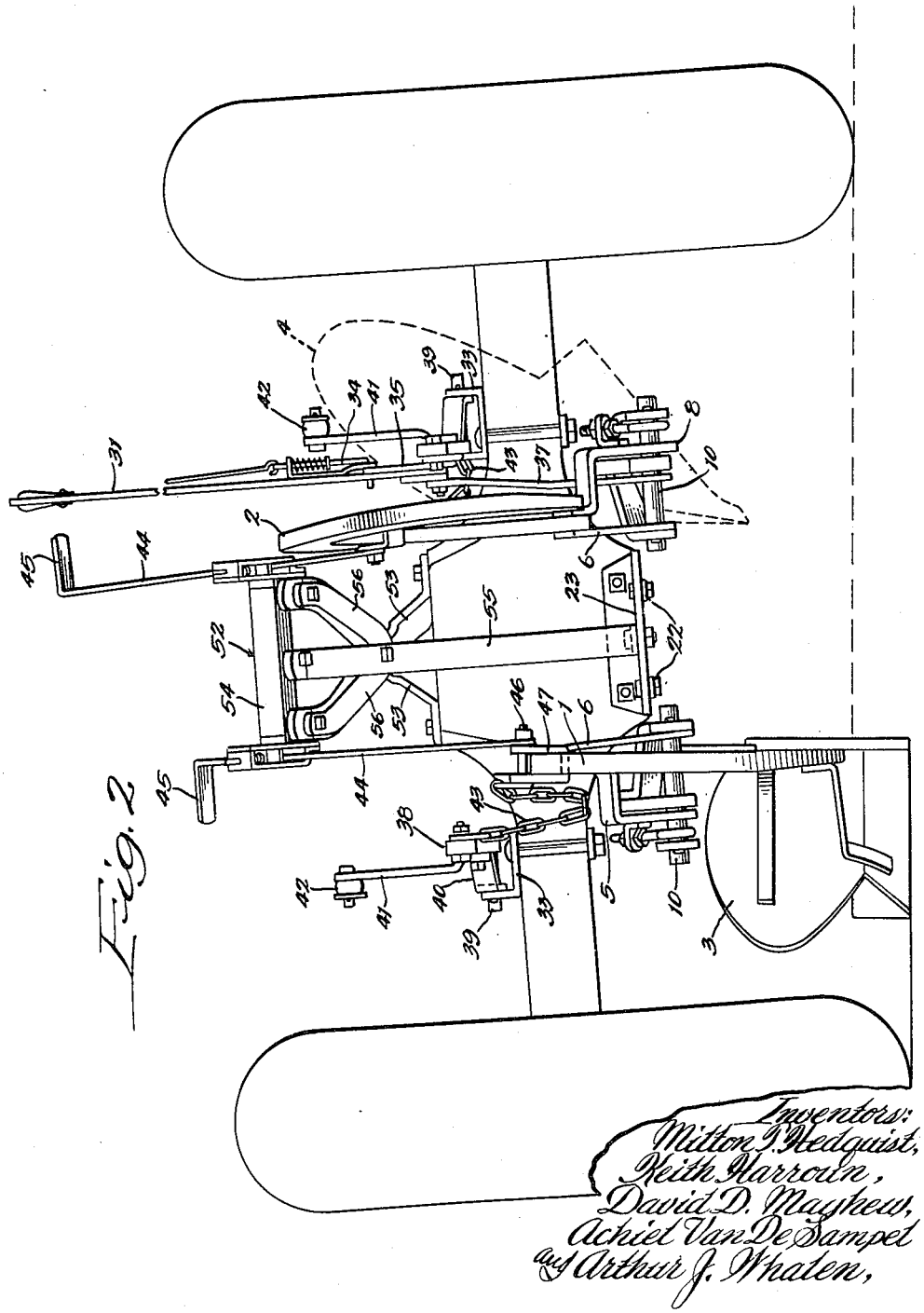

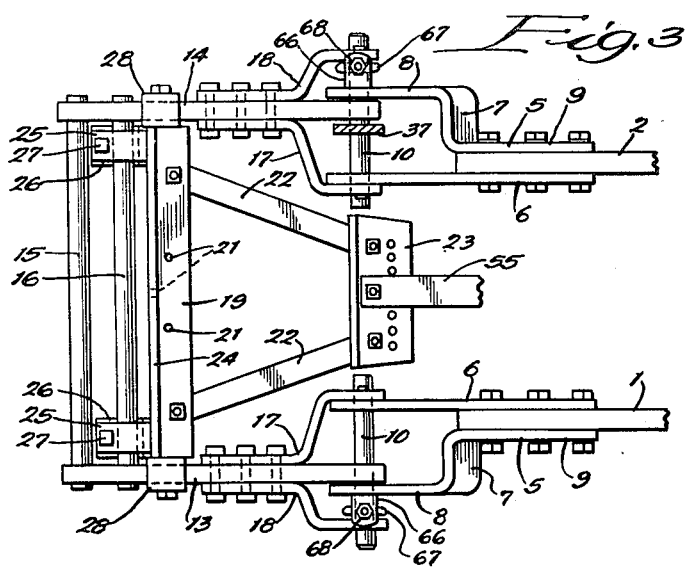
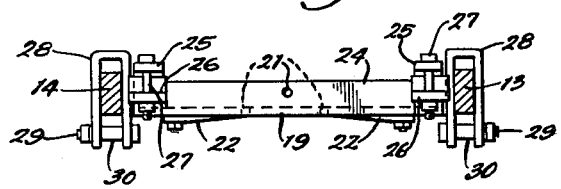
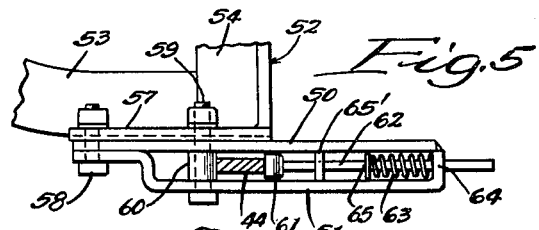
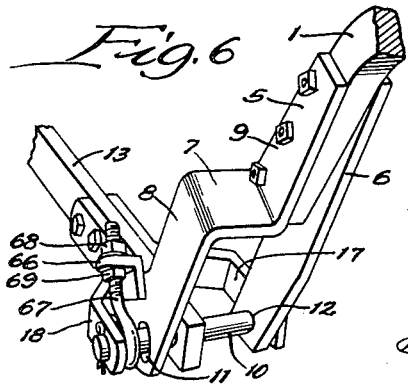

United States Patent Office 2,766,674
Patented Oct. 16, 1956

2,766,674

LATCH FOR TRACTOR MOUNTED TILTING PLOW

Milton T. Hedquist, Keith Harroun, David D. Mayhew, Achiel Van De Sampel, and Arthur J. Whalen, Rock Island, Ill., assignors to J. I. Case Company, a corporation of Wisconsin Original application March 30, 1945, Serial No. 585,772, now Patent No. 2,641,171, dated June 9, 1953. Divided and this application October 28, 1952, Serial No. 317,849

1 Claim. (Cl. 97—47.54)

This invention relates to two-way tractor mounted plows.

The main objects of the invention are to provide a two-way plow structure of the character indicated which may be easily mounted on a tractor; which, in use, may be easily adjusted for controlling the depth of plowing; which is equipped with a relatively simple and easily accessible means for leveling the plow bottoms with respect to the normal horizontal of the tractor when it is tilted incident to the running of one wheel in a previously plowed furrow while the other wheel is in elevated position on unplowed ground, and which embodies right and left hand plow units which are constructed largely of like parts and only a few of which are distinguishable as right and left hand parts, and to provide a two-way plow structure wherein the plows may be adjusted vertically into and out of operative position independently of each other by power lift means provided on the tractor.

Other objects and advantages of the invention will be understood by reference to the following specification and accompanying drawings (three sheets) wherein there is illustrated a two-way tractor mounted plow structure embodying a selected form of the invention.

In the drawings:

Fig. 1 is a side elevation of the structure as it appears upon the removal of one wheel of the tractor;

Fig. 2 is a rear elevation;

Figs. 3, 4 and 5 are fragmentary sections respectively on the lines 3—3, 4—4 and 5—5 of Fig. 1; and Fig. 6 is a perspective illustrating a detail of the structure.

The two-way plow structure herein illustrated, comprises left and right hand plow beams 1 and 2 respectively, having attached thereto plows 3 and 4. The plow beams 1 and 2 are of substantially like construction differing mainly in that the rear ends are oppositely offset outwardly slightly as illustrated in Fig. 2 in keeping with more or less common practice.

Except for certain elements of mechanism which are common to both the right and left hand structures, the following description of the left hand plow beam 1 and its operating parts will serve also as an explanation of the right hand unit, it being observed, however, that certain parts are made right hand instead of left hand as is clearly shown in the drawings.

The front end of each plow beam is provided with a fork formed by outer and inner bracket members 5 and 6 respectively (see Figs. 3 and 6). The inner member 6 is a straight bar-like extension of the inside surface of the plow beam and the outer member 5 includes an outwardly directed laterally extending portion 7 and a front end portion 8 which is offset outwardly from the rear portion 9 of the member. The offset form of the outer member 5 serves to increase the space between the forward portion of the inner member 6 and the forward portion 8 of the outer member considerably more than the thickness of the plow beam. The members 5 and 6 are suitably bolted to the member 1 as shown. Suitable pivot shafts 10 pass through holes 11 and 12 provided respectively in the front end portion 8 and in the front end portion of the inner member 6 as is perhaps best shown in Fig. 6.

The forked front ends of the respective plow units are connected through the respective pivot pins 10 to the rear ends of a bail-like structure which is, in turn, secured to the tractor for transmitting the pull of the tractor to the plow structures.

As shown in Fig. 3, the bail-like structure referred to comprises left and right side arms 13 and 14 which are rigidly interconnected by means of a pair of cross bars or rods 15 and 16 which pass through suitable openings in the front ends of the side members and are welded or otherwise rigidly secured thereto. The rear ends of the arms 13 and 14 are suitably apertured to receive the respective pivot pins 10 and said rear ends are further provided with inner and outer brackets 17 and 18 respectively having front end portions bolted to the sides of the respective arms and rear portions offset inwardly and outwardly respectively, and extended rearwardly to provide a fork-like rear end structure rigid with the respective side arms 13 and 14.

The rear ends of the fork arms 17 and 18 are also suitably apertured to receive the respective end portions of the pins 10. These fork arms 17 and 18 cooperate with the rear end portion of the respective arms 13 and 14 to maintain the pins 10 in relatively fixed relation to the bail-like draw bar structure which may hereinafter be referred to as a draw bar bail.

The draw bar bail is secured to the tractor as follows: An angle iron member 19 is bolted adjacent its central portion to a portion 20 of the rear axle housing, which is suitably formed to permit the attachments of such an angle iron. In Figs. 3 and 4 bolt holes 21 are shown for the passage of bolts through the angle iron member 19 into the rear axle housing for the purpose indicated. Said angle iron member 19 extends transversely of the tractor and is connected near its ends by means of suitable brace members 22—22 to the draw bar coupling plate 23 which is usually provided at the rear end of the rear axle housing of the tractor. Said draw bar plate 23 is, of course, rigidly secured to the tractor structure so that the braces 22 which preferably diverge forwardly are effective to rigidly hold the angle iron member 19 against rocking in a horizontal direction.

To the vertical flange 24 at the front of the angle iron 19 there is bolted near each end upper and lower clip or clevis members 25 and 26 respectively, the forward ends of which are connected by a suitable bolt 27. As is clearly shown in Fig. 1, the clevis members 25 and 26 and the bolt 27 cooperate to form a receiving socket for draw bar bail member 16 whereby forward or rearward movement of the tractor is transmitted to said draw bar bail. The bail is also permitted to rock in a vertical direction about the axis of the rod 16 as will be apparent from an inspection of Fig. 1.

To the opposite ends of the angle iron member 19 there are rigidly secured as by welding, inverted U-shaped clips such as shown at 28. These clips are adapted to embrace the respective side arms 13 and 14 of the draw bar bail and the lower ends of the clips are closed by transverse bolts 29 equipped with suitable spacing sleeves 30 to retain the arms 13 and 14 in the clips. The clips 28 thus serve to limit the extent to which the arms 13 and 14 may be rocked about the axis of the cross member 16.

When each plow unit is in its lowered operative or plowing position (the position in which the plow beam 1 and plow 3 are shown in Fig. 1), the plow floats and may rock vertically about the pivot pin 10 by means of which its plow beam is connected to the draw bar bail. The depth to which plowing is effected is controlled by adjusting the height of the pivot pin 10 and this may be effected by means of a hand lever 31. The hand lever 31 is pivoted as indicated at 32, on the right hand one of a pair of brackets 33 which are respectively mounted on the right and left hand axle housings as is shown in Figs. 1 and 2.

The brackets 33 may be merely clamped on the axle housings as shown, or if preferred, they may be rigidly secured by welding or otherwise. The lever 31 is provided with a more or less conventional spring actuated pin 34 which cooperates with a notched segment 35 carried by the bracket 33, for locking the lever in any selected position of adjustment.

Near its lower end, the lever 31 is provided with a rearwardly extending arm portion 36, the outer or rear end of which is connected by means of a link 37 to the pivot pin 10 of the right hand plow structure. It will be seen that any pivotal adjustment of the hand lever 31 will be transmitted directly by the link 37 to the right hand plow unit pivot pin 10. Since the right hand pivot pin 10 is carried by one arm of the rigid draw bar bail, the other arm and pivot pin will be simultaneously and correspondingly adjusted. Hence, the vertical position of both pivot pins 10 is readily adjustable simultaneously by operation of the hand lever 31.

Raising of the plow beams from operative to inoperative position is preferably effected by a connection to the usual power lift provided for that purpose on most tractors. In the construction illustrated, the means for lifting the plows comprise for each plow unit an arm 38 which is pivotally mounted at its front end as shown at 39 on the adjacent bracket 33. The arm 38 is preferably provided at its front end with a member 40 having relatively laterally offset forward and rear portions of which the rear portion is bolted in face-to-face relation to the arm 38 and the forward portion is adapted to cooperate with the front end of the arm 38 to engage horizontally spaced portions of the pivot pin 39. This arrangement serves to prevent twisting of the arm 38 about an axis extending longitudinally thereof. Each arm 38 is further provided with an upwardly extending arm 41 which has its upper end connected by means of a suitable link rod 42 to a power driven crank provided on the tractor. The link 42 for each plow unit is connected to its own power crank, there being such a power crank provided at each side of the tractor.

In the arrangement shown in Fig. 1, the link rod 42 extends forwardly and downwardly at a considerable angle which in this instance, represents the position of the connecting link when it is connected to the power crank of the tractor through a suitable bell crank power transmission arrangement located near the bottom of the tractor and having one arm linked to the power crank arm of the tractor. Such an arrangement is desirable in order that the links 42 be kept at a low elevation where they do not interfere with the access of the driver of the tractor to the driver's seat, and where there is less danger that the driver of the tractor will come in contact with the rods when they are operated for lifting the respective plows.

Upward movement of the rear ends of the plow lifting arms 38 is transmitted to the respective plows by means of a chain, such as indicated at 43, the opposite ends of which are suitably connected to the arm and plow beam.

The following structure is provided for releasably locking each plow in inoperative elevated position:

To each plow beam there is pivoted a bar 44, the upper end portion 45 of which is bent laterally outwardly as best shown in Fig. 2. The pivot connection of the bar 44 to the plow beam may be made by means of a bolt 46 which extends through and connects the free ends of a U-shaped clip 47 which embraces the plow beam as is shown in Figs. 1 and 2. The clip 47 may, of course, be adjusted to any desired position lengthwise of the plow beams and it may be locked in selected position by tightening the nut on the bolt to the required extent.

Near its lower end, each bar 44 is provided with a recess 48 in its front edge thereby forming a downwardly facing seat or shoulder 49. The upper end portion of each bar 44 is slidable in a guide means comprising a way provided between parallel, spaced-apart inner and outer members 50 and 51 respectively (Fig. 5), which are carried by a suitable frame structure 52. As shown in Figs. 1 and 2, the frame structure 52 comprises a pair of crossed bar members 53, the front and rear ends of which are respectively secured to the rear axle housing structure and to an angle iron member 54. A brace 55 having its upper end secured to said angle iron member 54 and its lower end secured to the draw bar angle plate 23, aids in supporting the frame structure 52 in the required position. To further support the angle member 54 against tilting, there is provided a V-shaped brace structure comprising arms 56—56 having their rear ends secured to the rear ends of the crossed members 53 and their converging ends bolted to the brace 55 as shown.

The angle member 54 has welded to it at each end, a transverse bar 57 which forms a mounting plate on which to attach the inner and outer members 50 and 51 by means of bolts 58 and 59 respectively. A suitable spacing sleeve 60 is provided on the bolt 59 to maintain the members 50 and 51 in suitably spaced relation, and the sleeve 60 is sufficiently wide to permit lateral movement of the bar 44 as during winging of the plow beam. The bar 44 is yieldingly pressed toward the spacing sleeve 60 by means of a follower 61 having a width sufficient to engage the edge of the bar 44 irrespective of the lateral position of the latter between the members 50 and 51. The follower 61 is carried by one end of a rod 62 which is urged to move in the required direction by a spring 63 which is under compression between a laterally inwardly bent portion 64 of the outer member 51, and a transverse pin 65 carried by the rod 62.

The rod 62 is slidably supported in suitable apertures provided in the end member 64 and in an intermediate plate 65' which is carried by the members 50 and 51. It will be seen that upward movement of the plow beam will be transmitted through the pivot 46 to the bar 44 and that when the plow is raised to the required elevation, the spring 63 will force the bar 44 to move forwardly slightly about its pivot 46 so as to cause the shoulder or seat 49 to overlie the transverse lip defined by the sleeve 60 which then serves as a supporting member to hold the plow in its elevated inoperative position. When the plow is to be lowered, it is only necessary to rock the upper end of the bar 44 rearwardly sufficiently to disengage its shoulder 49 from the support 60 whereupon the plow will be lowered to operative position by gravity. The laterally outwardly bent end portions 45 of the rods 44 facilitate such rearward rocking of the bars by hand, and they also serve to retain the bars 44 in the ways against any possible excessive downward movement of the plow beams and said bars.

In normal plowing, one wheel of the tractor rides in a previously made furrow, while the other wheel rides on unplowed ground with the result that the normal horizontal plane of the tractor is tilted slightly with respect to the plane of the ground. Such tilting, as shown in Fig. 2, makes it desirable to provide an adjustment whereby the plow beams and the plows carried thereby, may be adjusted to cause the bottoms of the plows to assume a position substantially parallel to the ground surface when in operative plowing position, as shown in Fig. 2. This adjustment is usually referred to as "winging" of the plow.

In the structure illustrated, such an adjustment is provided by making the hole 11 which receives the pivot pin 10 somewhat elongated in a vertical direction, and the hole 12 a loose fit on said pivot pin. This will permit the forked end of the plow beam to be rocked somewhat relative to the pivot pin 10 whereby the plow carried by the beam will be correspondingly adjusted.

For holding the plow beam in any selected position of adjustment relative to the pivot pin 10 there is provided an angle bracket 66 which has one leg rigidly secured by welding or otherwise to the front portion 8 of the plow beam fork, and its other arm provided with an opening for receiving the threaded end portion of an eye bolt 67. The eye of the eye bolt 67 is formed to be a snug fit about the adjacent end portion of the pivot pin 11 and upper and lower ends 68 and 69 respectively on the stem of the eye bolt to facilitate adjustment of the eye bolt relative to the bracket 66 and fork arm 8.

Such relative adjustment of the eye bolt relative to the fork arm 8 will, of course, serve to effect up and down adjustment of the fork arm 8 relative to the pivot pin 10 and thereby control the angular position of the plow beam and of the plow bottom with reference to the normal horizontal plane of the tractor, an adjustment usually referred to as "winging."

The described construction provides a relatively simple and inexpensive two-way plow structure which may be easily mounted on the tractor, and which may be easily removed therefrom to facilitate employment of the tractor for other purposes. The draw bar angle 19 need not be removed since it does not ordinarily interfere with any other implement which is attached to the tractor, and the normal draw bar coupling angle 23 may, of course, remain in place to serve its usual purpose. Changes in the described structure may be made without departing from the principles of the invention.

This application is a division of our copending application, Serial No. 585,772, filed Mar. 30, 1945, and issued as United States Patent No. 2,641,171.

We claim:

In combination with a tractor having a rearwardly extending drawbar, a plow beam mounted on said drawbar in a manner affording raising and lowering of the plow beam relative to said drawbar and affording limited turning movement of the plow beam about its longitudinal axis, and an improved latch means for maintaining said plow beam in its elevated, inoperative position, said latch means comprising a frame structure rigidly mounted on said tractor and extending rearwardly therefrom, a guide means fixed to said frame structure above said plow beams and comprising a pair of spaced-apart parallel members disposed in generally overlying relation to said plow beam, a latching bar pivoted to said plow beam and extending upwardly therefrom between said pair of parallel members, a latch element secured between said parallel members in transverse relation thereto and in position for sliding engagement with one edge of said latching bar as said plow beam is moved vertically relative to said drawbar, the spacing of said parallel members as defined by said latch element being substantially greater than the width of said one edge of said latching bar, to thereby provide for relative lateral movement therebetween as said plow beam is adjustably turned about its longitudinal axis, said latching bar including means defining a shoulder along said one edge adapted to engage said latch element to maintain the plow in a predetermined, elevated position, and a biasing means carried by said guide means in position for constantly urging said latching bar into engagement with said latch element, said biasing means including an elongated member disposed between said parallel members for axial movement relative thereto, a spring positioned to urge said elongated member toward the edge of said latching bar which is opposite said one edge, and including a follower on said elongated member in position for engagement with said opposite edge of said latching bar, said follower being sufficiently wide with respect to the spacing of said parallel members to engage said latching bar throughout the range of lateral movement afforded by said parallel members.

References Cited in the file of this patent
UNITED STATES PATENTS

| | | |
|---|---|---|
| 342,491 | Aspinwall | May 25, 1886 |
| 1,440,758 | Worthington | Jan. 2, 1923 |
| 1,717,804 | Monson | June 18, 1929 |
| 2,063,852 | Ray | Dec. 8, 1936 |
| 2,312,616 | Altgelt | Mar. 2, 1943 |
| 2,641,171 | Hedquist et al. | June 9, 1953 |